(12) United States Patent
Pal et al.

(10) Patent No.: US 9,001,276 B2
(45) Date of Patent: Apr. 7, 2015

(54) SYSTEM AND METHOD FOR MULTIPLEXING VIDEO CONTENTS FROM MULTIPLE BROADCASTING CHANNELS INTO SINGLE BROADCASTING CHANNEL

(75) Inventors: Arpan Pal, Kolkata (IN); Aniruddha Sinha, Kolkata (IN); Arindam Saha, Kolkata (IN); Hiranmay Ghosh, Gurgaon (IN); Gautam Shroff, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/130,103

(22) PCT Filed: Jun. 26, 2012

(86) PCT No.: PCT/IN2012/000454
§ 371 (c)(1),
(2), (4) Date: Dec. 30, 2013

(87) PCT Pub. No.: WO2013/024490
PCT Pub. Date: Feb. 21, 2013

(65) Prior Publication Data
US 2014/0139746 A1    May 22, 2014

(30) Foreign Application Priority Data

Jun. 30, 2011  (IN) .......................... 1894/MUM/2011

(51) Int. Cl.
| | |
|---|---|
| *H04N 5/38* | (2006.01) |
| *H04N 7/14* | (2006.01) |
| *G06F 21/00* | (2013.01) |
| *H04N 7/173* | (2011.01) |
| *H04N 7/08* | (2006.01) |
| *H04N 21/2343* | (2011.01) |

(Continued)

(52) U.S. Cl.
CPC ..... *H04N 7/0806* (2013.01); *H04N 21/234363* (2013.01); *H04N 21/234381* (2013.01); *H04N 21/6143* (2013.01); *H04N 5/38* (2013.01); *H04N 5/455* (2013.01)

(58) Field of Classification Search
None
See application file for complete search history.

(56) References Cited

U.S. PATENT DOCUMENTS

| | | | |
|---|---|---|---|
| 5,319,707 | A | 6/1994 | Wasilewski et al. |
| 6,357,042 | B2 | 3/2002 | Srinivasan et al. |
| 8,237,765 | B2 | 8/2012 | King et al. |

(Continued)

OTHER PUBLICATIONS

Tandberg Television, "Preparing for the Broadcast Analog Television Turn-Off: How to Keep Cable Subscribers' TVs from Going Dark," http://www.nab.org/documents/resources/paperGoldman.pdf (2008).

(Continued)

*Primary Examiner* — Jeffrey Harold
*Assistant Examiner* — Sean Haiem
(74) *Attorney, Agent, or Firm* — Finnegan, Henderson, Farabow, Garrett & Dunner, L.L.P.

(57) ABSTRACT

A method and system for multiplexing of multiple channels of video data through a single analog broadcasting channel is disclosed. The method enables a spatial and temporal multiplexing of videos of each of the multiple channels. The multiplexed content is created as a result of multiplexing that is encoded to generate digital transport stream that is transmitted through analog medium. The system enables a STB receiver to decode each of the videos from the stream. At least one video from the multiple videos is played on the television based on user selection.

13 Claims, 4 Drawing Sheets

(51) Int. Cl.
*H04N 21/61* (2011.01)
*H04N 5/455* (2006.01)

(56) References Cited

U.S. PATENT DOCUMENTS

| | | |
|---|---|---|
| 2001/0023436 A1* | 9/2001 | Srinivasan et al. ............ 709/219 |
| 2003/0018897 A1* | 1/2003 | Bellis et al. ................... 713/182 |
| 2004/0111754 A1 | 6/2004 | Bushey et al. |
| 2004/0123325 A1 | 6/2004 | Ellis et al. |
| 2006/0026662 A1* | 2/2006 | Shield et al. .................. 725/134 |
| 2007/0103387 A1* | 5/2007 | Kondo et al. .................. 345/1.2 |
| 2008/0316297 A1* | 12/2008 | King et al. ................. 348/14.09 |

OTHER PUBLICATIONS

Abnt et al., "Digital terrestrial television—Video coding, audio coding and multiplexing," http://www.dibeg.org/techp/aribstd/harmonization/090918_Harmonization_volume4_Multiplexing.pdf (Feb. 16, 2010) (earliest known date).

\* cited by examiner

SYSTEM AND METHOD FOR MULTIPLEXING VIDEO CONTENTS FROM MULTIPLE BROADCASTING CHANNELS INTO SINGLE BROADCASTING CHANNEL

CROSS-REFERENCE TO RELATED PATENT APPLICATIONS

This application is a National Stage Entry of International Application No. PCT/IN2012/000454, filed Jun. 26, 2012, which claims priority from Indian Patent Application No. 1894/MUM/2011, filed Jun. 30, 2011. The entire contents of the above-referenced applications are expressly incorporated herein by reference.

FIELD OF THE INVENTION

The invention generally relates to the field of broadcasting of video information in an analog broadcasting scenario. More particularly, the invention relates to a method and system for multiplexing analog video contents (usually carried by multiple analog broadcasting channels) to be carried by a single broadcasting channel through a digital broadcasting medium.

BACKGROUND OF THE INVENTION

There has been a rapid increase in the television viewership in the recent times. This is due to the fact of increased broadcasting channels that are constantly broadcasting various programmes related to entertainment, sports, current affairs, education, marketing and other information dissemination.

Television broadcast is being made in multiple ways including terrestrial, cable TV, satellite TV and Internet TV. In case of terrestrial television, the broadcasting station broadcasts signals comprising audio-visual contents which are captured by the terrestrial antennas installed at the receiver terminal, which tunes with the frequencies in order to view the said audio-visual contents.

Due to limited number of channels using terrestrial mode, the television broadcast further was extended to cable TV broadcasting, wherein the users' terminal is able to receive different programmes broadcasted by multiple channels tuned at different frequencies. Typically, co-axial cable is used for receiving multiple channels.

As the technology improved further, satellite TV broadcasting was introduced. In the satellite television, all the broadcasting channels transmit different programmes via satellite which are received by the dish antenna installed at the consumer's home who by using the Set-top Box (STB) receiver is able to play the programmes of the multiple channels broadcasting these programmes.

The world today has been apparently moving further from analog to digital television. That is these programmes are being broadcasted in a digital domain, transferred to the receiver and decoded to be watched on the television which can be digital or analog.

Thus, there has been a tremendous growth in the television broadcast and it is expected to grow at the constant rate in the coming years. It is now considered as the most reliable, efficient and cheapest mode for dissemination of information.

Further, due to the increased viewership and popularity of multiple programmes, these channels have extended the television viewership by introducing various interactive programmes such as distance learning, advertising, video using multiple cameras in a sports telecast, online gaming and online shopping etc. This has helped the television channel broadcasters to increase their revenues. Such a concept is generally termed as "Interactive TV". As a result the number of broadcasted channels facilitating broadcast of interactive TV content is on the rise.

However, there is a limited bandwidth available for transmitting the multiple channels. As a consequence of this limited bandwidth it is only possible to transmit limited data carried by such channels.

For example, in a country like India, it is a huge challenge to support distant learning in multiple states, each having their own curriculum and language, in a limited broadcast channels.

Let's consider the case for India having 26 recognized boards for school education in different states each having their own syllabus, if we assume that under each board, there are 6 classrooms displaying tutorial videos using 2 languages per tutorial video, it will need at least 26*6*2=312 broadcast channels. This is an infeasible proposition considering the economic structure and scarcity of available satellite bandwidth and other resources required.

Thus there is a need to design a system that reuses the standard broadcast infrastructure and standard receivers to support the requirement of sending these 312 tutorials using only a few broadcast channels. That is, there is a need of a technical solution that is capable of sending multiples channel of data through one channel using the existing broadcast infrastructure.

Several attempts have been made in the past that enable transmission of the multiple channels of data through a single channel. However, the systems and methods known in the art are limited to multiplexing and transmitting multiple channels carrying multimedia information in digital domain. Around 95 percent households today in developing countries like India still support analog television. Though, the concept of "Digital TV" has grown in leaps and bounds, it is still far from the rural areas that accounts around 75 percent population of India.

As will be appreciated, there is a clear a need to design a system feasible of sending multiple channels of data through one channel using existing analog broadcast infrastructure. That is, to design a system that is capable to reuse the standard broadcast infrastructure and standard receivers thereby enabling multiple channels of data to be transmitted in an analog domain and then receiving and extracting each of such transmitted channels separately.

More specifically, there is a long felt need to utilize the available bandwidth in a smarter way for transmitting multiple channels of analog data through a single analog broadcasting channel. For example, considering a distance learning environment or multiple videos captured by camera for telecasting sports content, there exists a need for broadcasting these multiple videos in analog domain by multiplexing the multiple channels carrying these videos through few broadcasting channels. As a result of such multiplexing and transmission of multiple videos in analog domain, it is possible to alleviate the limitations of prior arts in serving the broadcast of multiple channels of data in a digital broadcasting domain only.

OBJECTIVES OF THE INVENTION

The principal objective of the present invention to provide a method and system that enables multiplexing of multiple channels of analog video data in a single analog broadcasting channel.

Yet another objective of the invention is to enable a method for spatial and temporal multiplexing of multiple analog video frames of each of the videos carried by each of the broadcasting channels to create a multiplexed video content.

Yet another objective of the invention is to enable a method for embedding video related header information for spatial and temporal map in the multiplexed analog video frames related to each of the videos to create a bundled multiplexed content.

Yet another objective of the invention is to enable a method for encoding of the created bundled multiplexed video content to generate a digital elementary stream.

Yet another objective of the invention is to enable a method for generation of digital transport stream from the created digital elementary stream.

Yet another objective of the invention is to develop means that enable transport of the generated digital transport stream through a digital broadcasting medium.

Another object of the invention is to enable method for receipt of the digital transport stream that contains an encoded multiplexed video content.

Yet another objective of the invention is to enable method for demodulation of the received digital transport stream in order to decode the analog videos from the encoded multiplexed video content.

Yet another objective of the present invention is to enable a method for generation of a standard analog video output from the decoded analog videos.

Yet another objective of the present invention is to enable demultiplexing of each of the individual analog videos from the standard analog video output.

Still another objective of the present invention is to enable method for extraction of at least one analog video from the demultiplexed individual analog videos based on the embedded video related header information for each of the videos.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The following text presents a simplified, incomplete summary in order to provide an orientation to certain aspects of the disclosed subject matter. This Summary is not an extensive overview. It is not intended to identify key/critical elements or to delineate the scope of the claimed subject matter. Its sole purpose is to present some concepts in a simplified form as a prelude to the more detailed description that follows.

The present invention provides method and system for transmission of multiple channels carrying visual contents in an analog domain through a digital broadcasting medium using existing analog broadcast infrastructure.

According to the present invention, at the transmission end, each of the analog videos to be broadcasted is multiplexed in a spatial and temporal domain. The multiplexed videos comprise a 1D or 2D barcode indicated as a spatial and temporal map for each of the videos. As a result of this, a bundled multiplexed video content is created. The multiplexed video content is further encoded to generate a digital transport stream. The digital transport stream is then transmitted through digital broadcasting medium.

At the receiver end, a set top box (STB) receiver or a connected TV therewith, receives the digital transport stream, demodulates the said stream to decode each of the analog videos. Then, a standard analog video is generated from the decoded information. Further, each of the individual analog videos is demultiplexed from the standard analog video output.

The demultiplexed videos are selectively extracted for consumption by the user. Based on the user selected video, the corresponding video is extracted in analog domain based on spatial and temporal information of the videos embedded as part of the video as a barcode (1D or 2D).

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and architecture disclosed in the drawings.

The description has been presented with reference to an exemplary embodiment of the invention. Persons skilled in the art and technology to which this invention pertains will appreciate that alterations and changes in the described method and system of operation can be practiced without meaningfully departing from the principle spirit and scope of this invention.

DETAILED DESCRIPTION WITH BEST ENABLED MODE

The description along with the best enabled mode of the present invention is now described referring to FIGS. 1, 2, 3 and 4.

Figure 1:
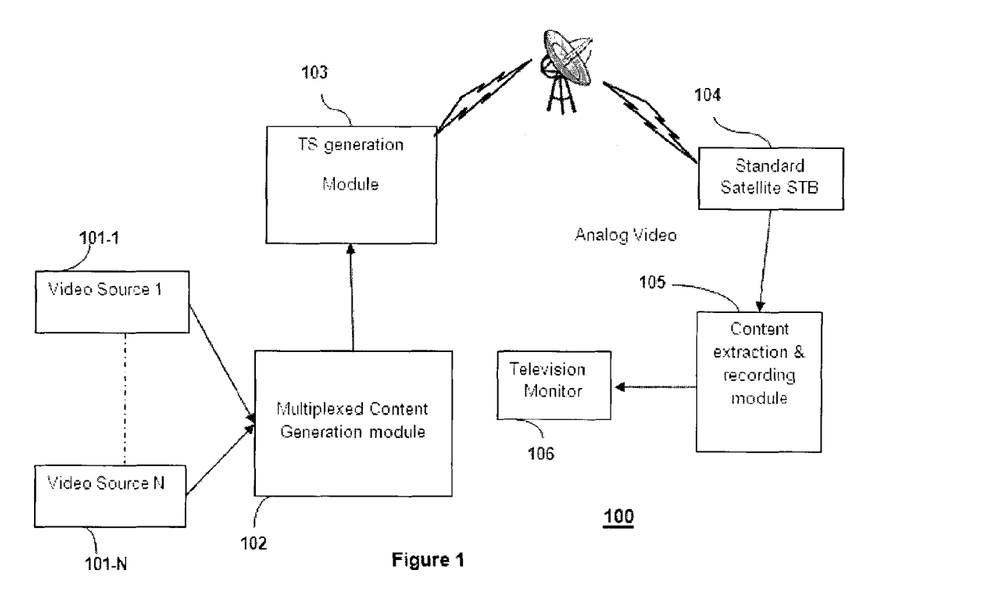
FIG. 1 schematically illustrates a block diagram 100 containing different system elements for transmission and reception of multiple channels of video data in an analog medium through a digital broadcasting medium according to an embodiment of the invention.

Referring to FIG. 1 is a block diagram comprising different system elements for transmission and reception of multiple channels of video data through a digital broadcasting medium in accordance to an embodiment of the invention.

As shown, the system 100 includes multiple video contents 101-1 . . . 101-N carried by multiple analog broadcasting channels that is received by the multiplexed content generation module 102. For the illustration of the best mode in accordance to this embodiment, following assumptions have been made to formulate the approximate requirement of the number of channels.

a. Each video is of 4 hrs duration
b. 24 hours broadcast environment
c. Every day new videos are transmitted
d. Multiplex 8 videos in each channel at a particular time with 1.5 mbps and 25 fps Thus with 24 hrs broadcast, it is possible to transmit 48 videos per day per channel.

The analog videos are multiplexed in a spatial and temporal domain to generate a bundled multiplexed video content. Each of the multiplexed video contains embedded barcode header information in the form of spatial and temporal map for each of the videos. The header information is multiplexed in the videos as per the technical means discussed in the prior Indian Patent Application 656/MUM/2011 titled "A Method and System for Implementation of an Interactive Television Application".

Figure 2:
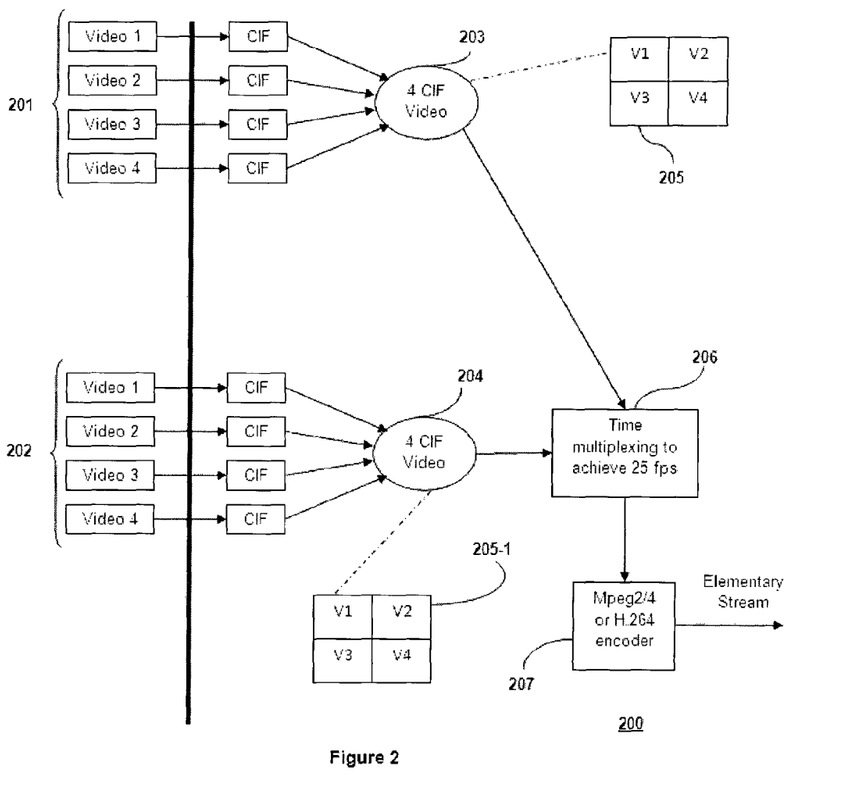
FIG. 2 is a block diagram 200 illustrating the creation of bundled multiplexed video content according an embodiment of the invention.

The generation of multiplexed video is described in FIG. 2. The multiplexed video content created is further encoded to generate a digital elementary stream. The digital elementary stream is converted in to a digital transport stream using the TS generation module 103. The generated transport stream is then transmitted through digital broadcasting medium to display on the television device 106.

As shown in the FIG. 1, a standard set-top-box (STB) 104 receives the transport stream generated by the TS generation module 103, it then decodes the multiplexed video content from the stream to generate a standard analog video output. The content extraction and recording module 105 receives the standard analog video output from the STB 104 and demultiplexer each of the analog videos.

Now based on the selection of the subscriber at least one analog video is extracted from the demultiplexed analog videos. The content extraction and recording module 105 as shown in FIG. 1 retrieves the spatial and temporal multiplexing map information from the barcode (1D or 2D) embedded in the video to extract the at least one analog video selected by the user. Then the extracted video can be played on the television display/monitor 106. The details of the content extraction and recording are further described in FIG. 4.

FIG. 2 is a block diagram 200 schematically depicting the creation of bundled multiplexed video content according an embodiment of the invention.

As illustrated in the FIG. 2, only one channel is used to send 8 channels of data. Therefore, the video resolution needs to be converted to CIF. Further the FIG. 2 also illustrates that, four analog videos 201 are carried by first set of four analog broadcasting channels and remaining four analog videos 202 are carried by second set of four analog broadcasting channels of the total eight analog broadcasting channels that are compressed to reduce the resolution to CIF (352×288). This compressing form the 4 CIF videos 203 and 204 is broadcasted by first set of four and second set of four broadcasting channels respectively. The spatial multiplexing of four videos has been discussed for describing the best mode of the present invention in accordance with an exemplary embodiment. However, the invention is enabled to multiplex any number of 'N' videos, where N is the number of videos. The more the number of N, the video quality per video will degrade as the total bandwidth is shared by N videos.

As shown in FIG. 2, the video frames of each of the CIF videos 203 is carried by four different broadcasting channels that are multiplexed in spatial domain to form a 2×2 array 205. The resolution of each frame thus becomes as 704×576.

By reducing the frame rate to half of the normal, the system enables adding four more multiplexed channels by temporal multiplexing. As shown, the video frames of each of the CIF videos 204 is carried by the second set of four different broadcasting channels are multiplexed in spatial domain to form a similar 2×2 array 205-1 as that of 205.

Further, the padding or cropping of some videos is undertaken in order to achieve the resolution of each such video that is compatible with the SD standard for broadcasting. This resolution should also need to be compatible with the PAL or NTSC standard.

Considering PAL system the frame rate of each video will be reduce to 12 fps and this reduced frame rate enables to multiplex two channels i.e. arrays 205 and 205-1 in time domain. As shown in FIG. 2, the video encoded to CIF resolution, is encoded to 12 fps and finally two such streams (12 fps stream) are temporally multiplexed together by temporal multiplexing module 206. So totally 4*2=8 channels are multiplexed within one channel as shown in the FIG. 2. One frame per second contains the 1D or 2D barcode which contains the spatial and temporal multiplexing information of all the videos.

Now while encoding to create the final Elementary stream, the encoder 207 is configured as 4 VOPs for MPEG4 encoder. This data can be broadcasted through analog medium.

Figure 3:
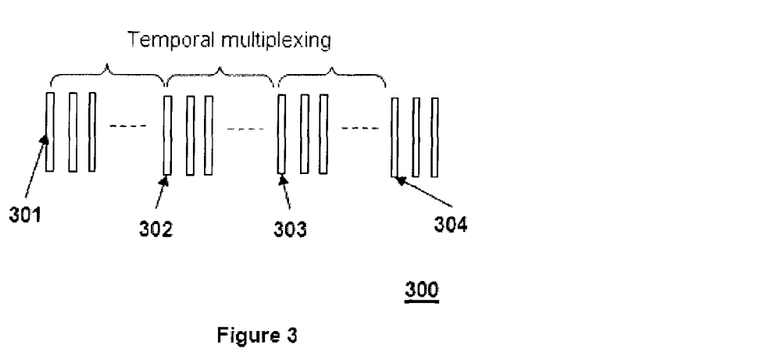
FIG. 3 schematically depicts the process 300 of spatial and temporal multiplexing of multiple analog video frames according to an embodiment of the invention.

FIG. 3 is a sequence diagram 300 schematically illustrating a process of spatial and temporal multiplexing of multiple analog video frames according to an embodiment of the invention.

The videos to be inserted are segmented in the time domain. Equal time segments are spatially multiplexed as shown in FIG. 2. The GOP headers are then inserted at the beginning of a segment of a first set of videos (say VideoSet-A). The VideoSet-A contains spatial multiplexed videos as described in FIG. 2. The first frame of VideoSet-A is independently encoded as I-frame using a standard video encoder such as MPEG-2, MPEG4 or H.264 etc. The remaining part of VideoSetA is encoded as Intra (I), Predictive (P) or Bidirectional (B) frames.

The segment of second set of videos (say VideoSet-B) starts with I-frame 302. The segment of Kth set of videos (say VideoSet-K) starts with I-frame 303. Once all the segments of video sets are inserted, then the end of GOP is indicated by another start of the GOP 304 which marks the start of the next segment. Then the GOP pattern repeats.

Figure 4:
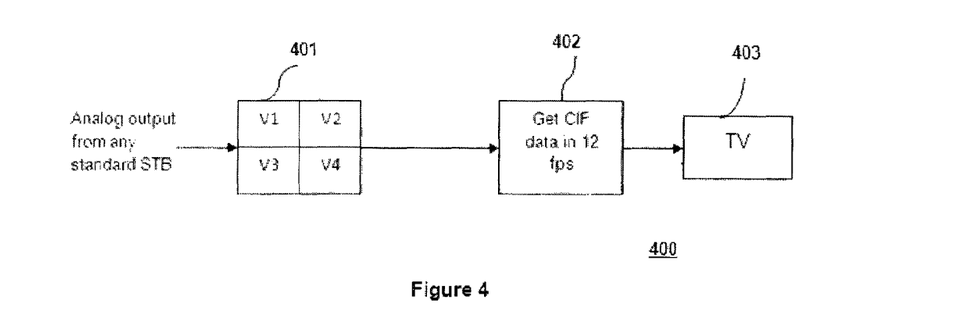
FIG. 4 is a block diagram 400 illustrating the extraction of bundled multiplexed video content according an embodiment of the invention.

FIG. 4 is a block diagram 400 schematically illustrating the extraction of bundled multiplexed video content according an embodiment of the invention.

From the standard satellite STB, each of the multiple video frames in 4CIF format in the form of standard analog video output will be received. As the received videos are multiplexed, demultiplexing of videos is required to extract the intended video. One such frame 401 is shown in the FIG. 4. The cropping of one fourth portion of the frame 401 enables to extract the intended video frame 402 from total multiplexed frame as shown in FIG. 4.

The identification for the required video is done using the obtained broadcast timing and spatial and temporal location information from the barcode (1D or 2D) embedded as part of the video. Thus, the demultiplexing and extraction of a desired at least one video from the bundled multiplexed video content is done using the spatial and temporal map available in the form of a barcode information as part of the analog video frame. Thus, the desired video is extracted from the video frame 402 to be displayed on the TV/monitor 403.

Advantages of the Invention

The present invention has following advantages:

The present invention enables efficient usage of the available bandwidth in a smarter way by multiplexing at least 8 channels and transmitting in a single analog broadcast channel.

The present invention allows the user (client) to select the desired video that needs to be extracted.

The present invention enables to wait for the actual time for the broadcast video to arrive. Once the broadcast video starts then it uses the spatial and temporal map to extract the desired video.

The description has been presented with reference to exemplary embodiments of the invention. Persons skilled in the art and technology to which this invention pertains will appreciate that alterations and changes in the described method and apparatus of operation can be practiced without meaningfully departing from the principle, spirit and scope of this invention.

The invention claimed is:

1. A method for transmission of a plurality of analog videos carried by a plurality of analog broadcasting channels through a digital broadcasting medium, the method comprising:
   spatially multiplexing a first set of video frames of a first set of analog videos to form a first array of multiplexed video frames;
   spatially multiplexing a second set of video frames of a second set of analog videos to form a second array of multiplexed video frames, wherein the first array of multiplexed video frames and the second array of multiplexed video frames are formed upon reducing a frame rate of each analog video to a half frame rate;
   temporally multiplexing the first array of multiplexed video frames with the second array of multiplexed video frames;
   multiplexing header information related to the first and second set of video frames in a spatial domain and a temporal domain to generate a bundled multiplexed video content, wherein the bundled multiplexed video content comprises at least a single dimensional barcode or a two dimensional barcode, and wherein the single dimensional barcode and the two dimensional barcode indicate a spatial and temporal map for the first set of analog videos and the second set of analog videos;
   encoding the bundled multiplexed video content to generate a digital video elementary stream;
   generating a digital transport video stream from the generated digital video elementary stream; and
   transporting the generated digital transport stream through a digital broadcasting medium.

2. The method of claim 1, wherein the first set of analog videos and the second set of analog videos are compressed before spatial multiplexing.

3. The method of claim 1, wherein the plurality of analog videos represents video data broadcasted by plurality of channels.

4. A method for receiving a plurality of analog videos carried by a plurality of broadcasting channels through a digital broadcasting medium, the method comprising:
   receiving a digital transport stream including an encoded multiplexed content comprising a first array of multiplexed video frames with a second array of multiplexed video frames, wherein a frame rate of each analog video corresponding to the first array of multiplexed video frames and the second array of multiplexed video frames is reduced to a half frame rate;
   demodulating the received digital transport stream to decode a first set of analog videos and a second set of analog videos;
   generating a standard analog video output comprising the decoded first set of analog videos and second set of analog videos;
   demultiplexing the first set of analog videos and the second set second set of analog videos from the generated standard analog video output; and
   extracting at least one analog video from the demultiplexed first set of analog videos and the demultiplexed second set of analog videos based on a single dimensional barcode or a two dimensional barcode, wherein the single dimensional barcode and the two dimensional barcode indicate a spatial and temporal map for the demultiplexed first set of analog videos and the demultiplexed second set of analog videos.

5. The method of claim 4, wherein the said analog videos represents video data broadcasted by plurality of channels.

6. A system for transmission of a plurality of analog videos carried by a plurality of analog broadcasting channels through a digital broadcasting medium, the system comprising:
   a spatial multiplexer to multiplex a first set of video frames of a first set of analog videos to form a first array multiplexed video frames;
   a spatial multiplexer to multiplex second set of video frames of a second set of analog videos to form a second array of multiplexed video frames, wherein the first array of multiplexed video frames and the second array of multiplexed video frames are formed upon reducing a frame rate of each analog video to a half frame rate;
   a temporal multiplexer to multiplex the first array multiplexed video frames with the second array of multiplexed video frames;
   a multiplexer to multiplex a header information related to the first and second set of videos in a spatial domain and a temporal domain to generate a bundled multiplexed video content, wherein the bundled multiplexed video content comprises a single dimensional barcode or a two dimensional barcode, and wherein the single dimensional barcode and the two dimensional barcode indicate a spatial and temporal map for the first set of analog videos and the second set of analog videos;
   an encoder to encode the said bundled multiplexed video content to generate a digital video elementary stream; a transport stream generator to generate a digital transport video stream from the generated digital video stream; and a transmitter to transmit the generated digital transport stream through a digital broadcasting medium.

7. The system of claim 6, wherein the plurality of analog videos represents video data broadcasted by plurality of channels.

8. A system for receiving a plurality of analog videos carried by a plurality of broadcasting channels through a digital broadcasting medium, the system comprising:
   a receiver to receive a digital transport stream, the transport stream including an encoded multiplexed content comprising a first array of multiplexed video frames with a second array of multiplexed video frames, wherein a frame rate of each analog video corresponding to the first array of multiplexed video frames and the second array of multiplexed video frames is reduced to a half frame rate;
   a demodulator to demodulate the received digital transport stream to decode a first set of analog videos and a second set of analog videos;
   an analog video generator to generate a standard analog video output comprising the decoded first set of analog videos and second set of analog videos;
   a demultiplexer to demultiplex the first set of analog videos and the second set of analog videos from the generated standard analog video output; and a content extractor to extract at least one analog video from the demultiplexed first set of analog videos and the demultiplexed second set of analog videos based on a single dimensional barcode or a two dimensional barcode, wherein the single dimensional barcode and the two dimensional barcode indicate a spatial and temporal map for the demultiplexed first set of analog videos and the demultiplexed second set of analog videos.

9. The system of claim 8, wherein the analog videos represents video data broadcasted by plurality of channels.

10. The system of claim 6, wherein the first set of analog videos and the second set of analog videos are compressed before spatial multiplexing.

11. A non-transitory computer-readable medium storing computer-executable instructions for:
spatially multiplexing a first set of video frames of a first set of analog videos to form a first array of multiplexed video frames;
spatially multiplexing a second set of video frames of a second set of analog videos to form a second array of multiplexed video frames, wherein the first array of multiplexed video frames and the second array of multiplexed video frames are formed upon reducing a frame rate of each analog video to a half frame rate;
temporally multiplexing the first array of multiplexed video frames with the second array of multiplexed video frames;
multiplexing header information related to the first and second set of videos in a spatial domain and a temporal domain to generate a bundled multiplexed video content, wherein the bundled multiplexed video content comprises a single dimensional barcode or a two dimensional barcode, and wherein the single dimensional barcode and the two dimensional barcode indicate a spatial and temporal map for the first set of analog videos and the second set of analog videos;
encoding the bundled multiplexed video content to generate a digital video elementary stream;
generating a digital transport video stream from the generated digital video elementary stream; and
transporting the generated digital transport stream through a digital broadcasting medium.

12. The medium of claim 11, further storing instructions for: compressing the first set of analog videos and the second set of analog videos before spatial multiplexing.

13. The medium of claim 11, wherein the plurality of analog videos represents video data broadcasted by plurality of channels.

* * * * *